Dec. 4, 1945.   G. R. ROEMER   2,390,174
CONTINUOUS MANUFACTURE OF WELDED WIRE MESH
Filed Jan. 1, 1943   3 Sheets-Sheet 1

Inventor
George R. Roemer
By Frease and Bishop
Attorneys

Dec. 4, 1945. G. R. ROEMER 2,390,174
CONTINUOUS MANUFACTURE OF WELDED WIRE MESH
Filed Jan. 1, 1943 3 Sheets-Sheet 3

Inventor
George R. Roemer
By Frease and Bishop
Attorneys

Patented Dec. 4, 1945

2,390,174

UNITED STATES PATENT OFFICE 2,390,174

CONTINUOUS MANUFACTURE OF WELDED WIRE MESH

George R. Roemer, Mount Lebanon, Pa.

Application January 1, 1943, Serial No. 470,975

9 Claims. (Cl. 219—4)

The invention relates generally to the manufacture of wire mesh fabric, and more particularly to the continuous manufacture of flat wire mesh having line wires and stay wires welded together at the joints.

Prior apparatus for making flat welded wire mesh includes an endless chain conveyor having spaced links carrying stay wires and acting as welding electrodes, with the line wires resting on top of the stay wires, and rotary welding electrodes pressing down on the line wires to weld them to the stay wires two joints at a time in series, the resistance of the wires at the joints providing the heat for welding.

While welded wire mesh can be made continuously in such apparatus, the speed of manufacture is limited and the apparatus has certain inherent disadvantages resulting primarily from the fact that two rotary electrodes are electrically connected through long leads to the secondary circuit of a stationary transformer by brushes or sliding contacts. In order to make the process continuous and rapid, a low voltage electric current of several thousand amperes must flow from the transformer through the rotary electrodes, so that the electric resistance of the wire at the joints will instantaneously generate sufficient heat to form the weld.

In transmitting this high current required for welding from the transformer through long leads to the rotary electrodes by means of sliding contacts, a high power loss is bound to result, and it is extremely difficult to adjust the welding current for different gauges of wire. Moreover, overhauling or replacement of the brushes or sliding contacts is required at very frequent intervals resulting in a production time loss, and it is necessary to continually adjust the welding heat to produce uniform welds because the resistance of the circuit varies constantly during operation due to the sliding contacts.

Another disadvantage of such prior methods and apparatus for continuously making welded wire mesh is that variations in the gauge of the wires will cause unequal pressures at the joints and produce non-uniform welds. Moreover, it is highly impracticable to perform series-parallel welding with such prior apparatus, because series-parallel welding requires passing the current in one transformer secondary circuit through four or more joints between line wires and stay wires, which produces increased power loss and resistance variation and also greater variation in pressure at the joints being welded.

Still another disadvantage of such prior constructions is that the spaced links of the chain conveyor acting as the lower electrodes collect spelter, especially where coated wires are being welded, which accumulation prevents good welding contacts and uniform welds as the links continue to carry successive stay wires under the upper rotary electrodes.

Accordingly, it is a general object of the present invention to provide a novel and improved method of continuously making flat welded wire mesh, which overcomes the disadvantages of prior constructions.

A more specific object is to provide improved rotary welding means for conducting a high amperage welding current through the joints being welded with a minimum of power loss and resistance variation in the welding circuit.

Another object is to provide improved welding means for eliminating sliding contacts and transmitting high amperage current from the transformer secondary circuit through the welding electrodes.

A further object is to provide an improved continuous method of making welded wire mesh, which is more rapid and produces more uniformity in the welded joints.

Another object is to provide an improved method which is adapted to produce continuously either series welded or series-parallel welded wire mesh fabric.

Another object is to provide an improved method in which all of the welded joints are substantially uniform, by providing for substantially equal pressures on joints which are welded simultaneously.

A further object is to provide for producing welded wire mesh having uniformly good welded joints, by keeping the contact surfaces of the welding electrodes constantly clean.

A still further object is to provide an improved method of continuously welding wire mesh, in which the joints are welded successively at points spaced longitudinally and transversely of the path of movement of the fabric, so as to provide space for the welding electrodes and reduce the power required at any one time.

These and other objects are accomplished by the methods, combinations and arrangements comprising the present invention, which is shown by way of example in the accompanying drawings, and hereinafter described and claimed.

In general terms, the invention may be stated as including passing line wires with stay wires positioned across the same between upper and lower rotary electrodes, one of said electrodes embodying a welding transformer and provided with electrode surfaces connected in the secondary circuit of the transformer, said electrode surfaces being adapted to contact one or more pairs of line wires at joints between the line wires and stay wires, and the other of said electrodes being adapted to exert uniform pressure on the wires at the joints, and to provide a parallel path for the secondary circuit flowing through the stay wire between the joints being welded.

In the drawings, a preferred embodiment of apparatus for carrying out the novel method is illustrated diagrammatically, various modifications of the apparatus being intended to come within the scope of the appended claims.

Referring to the drawings.

Similar numerals refer to similar parts throughout the drawings.

While for convenience, I have shown the invention as applied to a wire mesh fabric having eighteen line wires and stay wires spaced apart at greater intervals than the line wires, it will be understood that within the scope of the invention, the size, spacing, and number of the line wires and stay wires will be varied to suit the purposes for which the wire mesh is intended.

Figure 1:
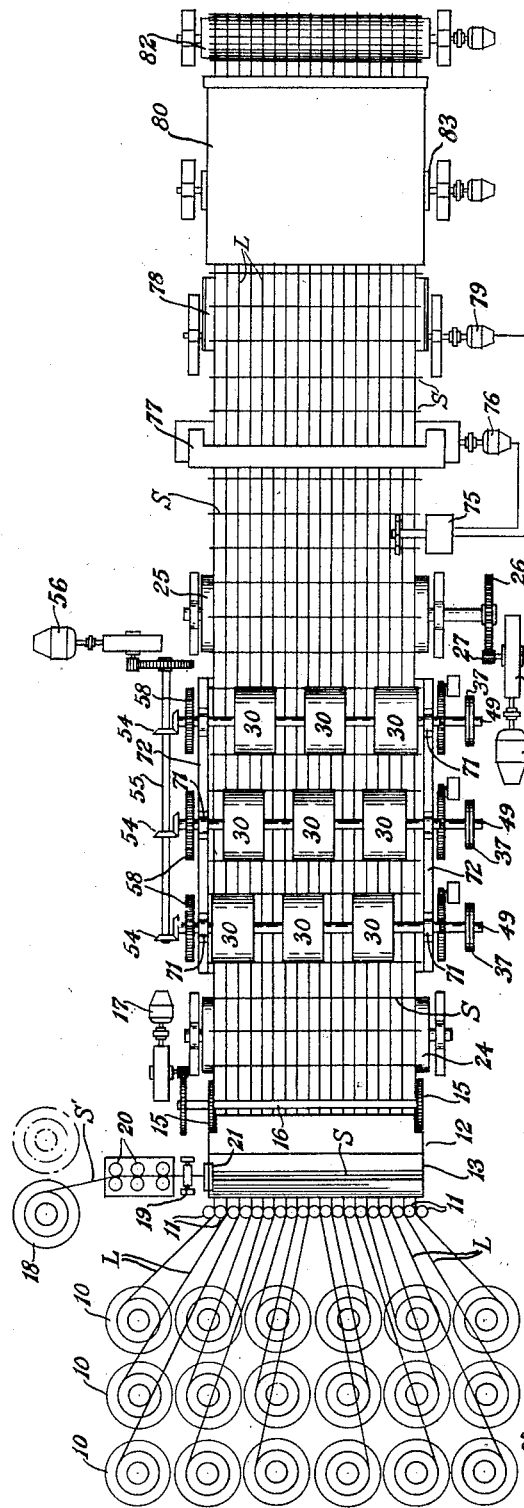
Figure 1 is a diagrammatic plan view of one arrangement of the apparatus for continuously making flat welded wire mesh according to the invention.
Figure 2:
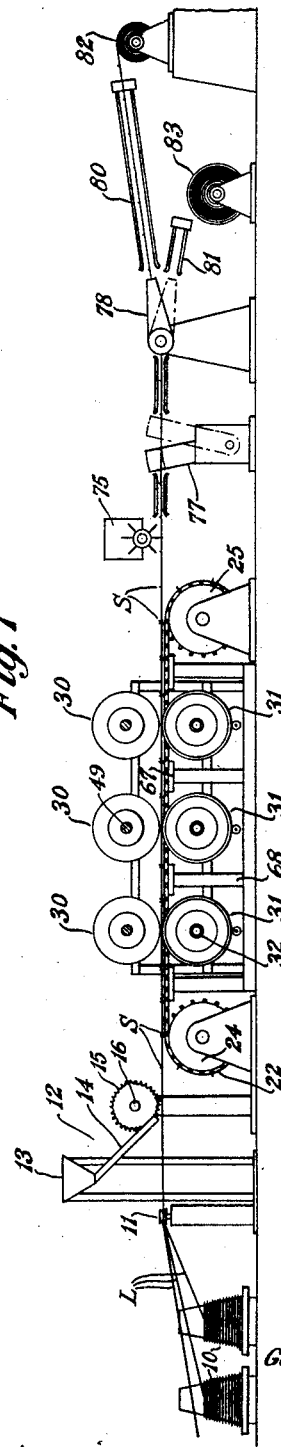
Fig. 2 is a side elevation thereof.

Referring first to Figs. 1 and 2, line wires L are pulled at a constant predetermined speed from reels 10 through guide rollers 11, which space the line wires apart at the intervals desired in the finished product. Alternate reels (not shown) may be provided for supplying line wires while the reels 10 are being replenished.

The line wires L are passed continuously from guide rollers 11 in parallel longitudinal directions, and a stay wire feeding device indicated generally at 12, is provided for positioning stay wires transversely across the line wires at desired intervals.

The stay wire feeding device may include a hopper 13 in which stay wires S cut to length are collected, and a chute 14 discharging a single row of stay wires from the hopper onto the line wires. Means for feeding the cut stay wires at proper intervals may include toothed wheels 15 mounted on a shaft 16 adjacent the discharge end of the chute 14 and driven at the regulated speed by suitable driving means including the motor 17. If desired, more than one feeding device 12 may be provided for feeding stay wires at close intervals.

The stay wires may be straightened and cut to length at a location remote from the moving line wires, or this operation may be performed adjacent to the moving line wires in a manner indicated diagrammatically in Fig. 1. Wire S' for forming stay wires is pulled from a reel 18 by pinch rolls 19 through wire straightening rolls 20. From the pinch rolls the stay wire passes through a shear 21 and over the hopper 13. Suitable means (not shown) such as an electrical or electronic timing device may be provided to actuate the shear at proper time intervals necessary to cut off stay wires S, whence they drop into hopper 13 and discharge through chute 14.

Figure 3:
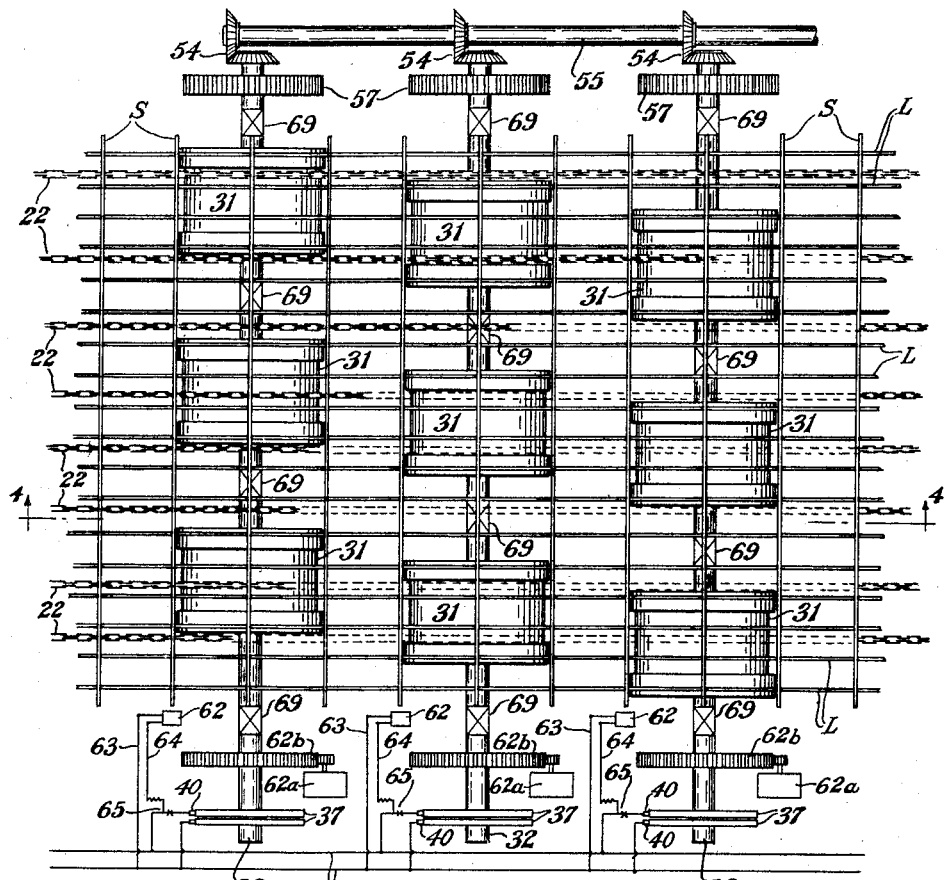
Fig. 3 is an enlarged diagrammatic plan view of one embodiment of the apparatus for carrying out the welding step.

The line wires L with the stay wires positioned across the same, pass from the stay wire feeding device over the upper runs of a transversely spaced series of endless conveyor chains 22 (Fig. 3). The chains 22 have upwardly projecting fingers 23 spaced apart at longitudinal intervals equal to the desired spacing of the stay wires, and a transverse row of these fingers 23 engages behind each stay wire to position the same for being welded to the line wires. As each stay wire is welded, the fingers 23 serve to pull the stay wires and line wires welded thereto through the welding apparatus.

The conveyor chains 22 preferably pass around a rear sprocket drum 24 and a front sprocket drum 25, and sprocket drum 25 is preferably driven at the required speed by suitable means such as a gear 26 on the sprocket shaft, pinion 27, speed reducer 28 and motor 29.

The welding apparatus preferably includes upper and lower rotary electrodes for welding the line wires and stay wires together at their joints, and each pair of upper and lower rotary electrodes is adapted to weld two or more line wires to each stay wire. Since eighteen line wires are shown on the drawings, nine pairs of electrodes are provided.

Figures 5, 6:
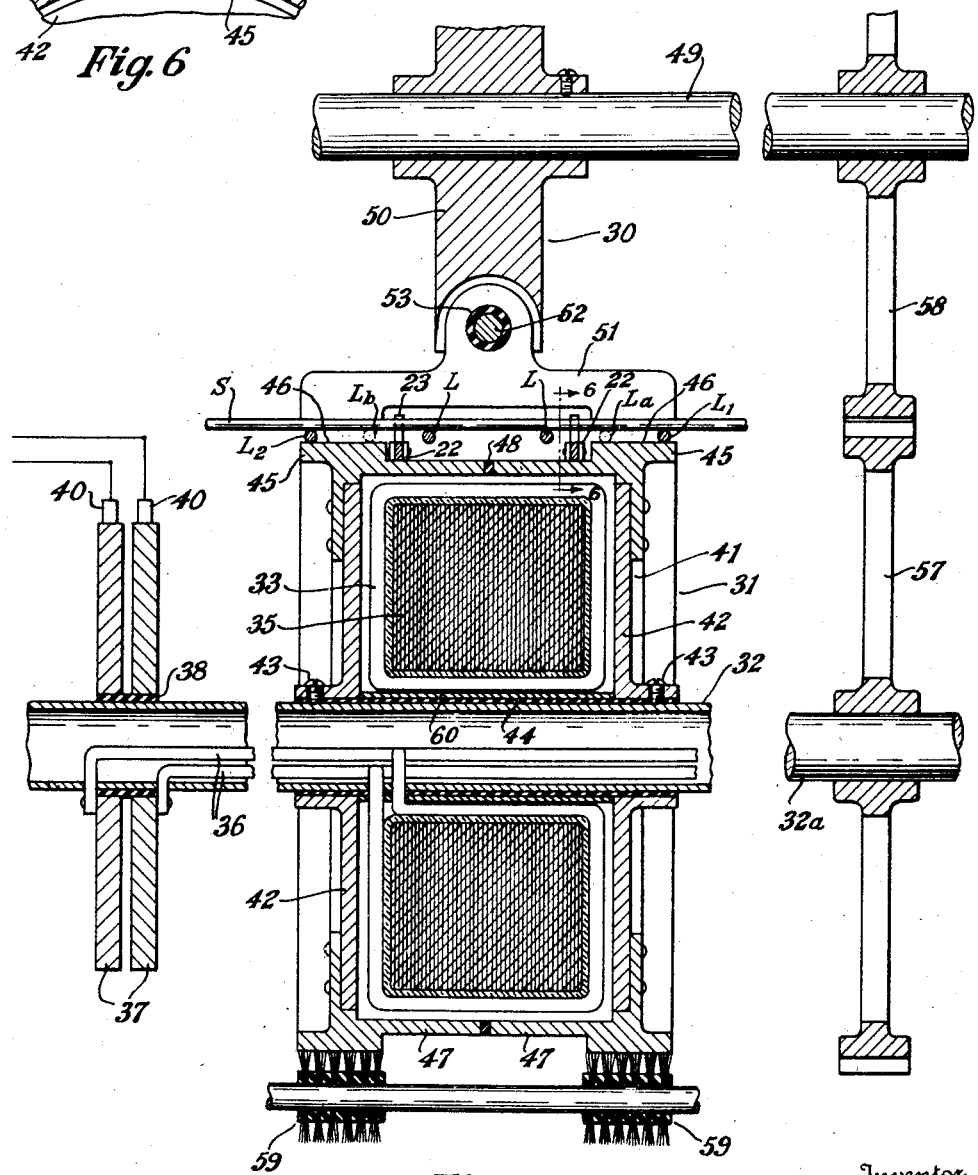
Fig. 5 is an enlarged diagrammatic transverse sectional view through one pair of the rotary welding electrodes.
Fig. 6 is a fragmentary sectional view as on line 6—6, Fig. 5.

The construction of one pair of upper and lower rotary electrodes is shown in Fig. 5, the constructions of the other pairs of electrodes being identical therewith. As shown, the upper rotary electrode is indicated generally at 30 and the lower rotary electrode is indicated generally at 31. The electrode 31 is mounted on a hollow shaft 32 of non-magnetic material and includes a rotatable transformer preferably surrounding the shaft 32. The primary winding 33 of the transformer surrounds a preferably annular core 35, the termination of the primary winding being electrically connected by conductors 36 to collector rings 37 on the outer end of the shaft 32 and insulated therefrom as indicated at 38. High voltage low amperage current is conducted from a supply circuit 39 (Fig. 3), to the collector rings 37 by brushes 40.

As shown in Fig. 3, three transversely spaced electrodes 31 are mounted on each of three shafts 32 and current from the collector rings 37 may be conducted to each transformer 33 by the conductors 36. If desired, three pairs of collector rings may be provided on each shaft 32 with separate conductors connecting each pair to a separate transformer; or one collector ring can be provided and connected to one primary terminal of each transformer, and a separate ring provided for the other terminal of each primary.

The secondary of each rotatable transformer is preferably in the form of a metal shell 41 surrounding the primary 33 and preferably includes end disks 42 secured to the shaft 32 as by screws 43 and insulated from the shaft by an insulating sleeve 44.

The secondary shell 41 also includes flanged contact rings 45 secured to the disks 42 and having outer preferably continuous cylindric contact surfaces 46 for contacting the line wires L. Between the contact surfaces 46 are cylindric flange portions 47 providing a closure for the primary winding, and said portions 47 are insulated from each other at 48.

The upper rotary electrode 30 is mounted on an upper shaft 49 extending parallel to shaft 32, there being an upper rotary electrode directly over each electrode 31. Each upper electrode 30 preferably includes a disk 50 secured to shaft 49 and having a plurality of pressure members 51 around its periphery. Each pressure member 51 preferably is mounted at 52 for rocking transversely on the disk 50 and insulated therefrom at 53, and the pressure members are spaced apart at intervals equal to the longitudinal spacing of the stay wires.

As indicated in Figs. 1 and 3, the shafts 32 on which the lower electrodes are mounted are driven at constant speed by means of bevel gears 54 operatively connecting the shafts 32 to a cross shaft 55, which is driven by a motor 56. As shown in Fig. 5, an extension 32a of each shaft 32 is provided with a gear 57 meshing with a gear 58 on the upper shaft 49, for driving the upper electrodes at the same speed so that as each stay wire passes between a pair of upper and lower rotary electrodes, a pressure member 51 is brought into the position shown in Fig. 5 to press the stay wire against the line wires backed up by the contact surfaces of the lower electrode. From time to time gears 57 may be rotated a distance of one tooth on shaft 32 to obtain new welding spots on rings 45, and after a considerable period of use, the surfaces 46 of the rings may be machined.

The contact surfaces 46 of the lower electrode 31 are made wide enough each to contact two line wires when wire mesh having a closer line wire spacing is being welded, as indicated at $La$ and $Lb$ in dot-dash lines in Fig. 5. In such case the welding circuits would be in series-parallel, as hereinafter described.

Preferably, rotary brush means 59 is provided for keeping the contact surfaces 46 clean and free of spelter, which tends to collect on the contact surfaces when coated wires are welded.

During the welding operation, the flow of current is from the collector rings 37 through the primary conductors 36 and thence through the primary winding 33. The secondary current induced in the secondary shell 41, flows from one end disk 42 to the other through a metal spacer sleeve 60 abutting the disks and preferably insulated from the shaft 32 by the insulating sleeve 44, then through one contact ring 45 and the line wire $L_1$ in contact therewith and through the stay wire S to the other line wire $L_2$ in contact with the other ring 45.

The resistance of the line wires and stay wire at the joints generates the heat necessary to form the welds between the wires at those two points, and the current flows through the pressure member 51 from line wire $L_1$ to $L_2$ in a path parallel to the path through the stay wire, so that the stay wire is not heated to welding temperature between joints.

When the line wire spacing is close enough so that each contact ring 45 contacts at least one additional line wire, as indicated at $La$ and $Lb$ in Fig. 5, the secondary current will flow in parallel paths through line wires $L_1$ and $La$, through stay wire S and then through line wires $L_2$ and $Lb$ in series with $L_1$ and $La$, which constitutes series-parallel welding. In such case it may be desirable to provide a slightly modified arrangement and mounting of the pressure members 51 on the upper electrode, in order to insure equal pressures on all the joints being simultaneously welded, as equal pressure at all points is increasingly important in series-parallel welding.

In either series or series-parallel welding according to the present invention, uniform welds can be made continuously at high speed because the high amperage welding current is induced in the secondary of the rotary transformer, which is part of the rotary electrode, without requiring long leads and sliding contacts needing frequent replacement, to transmit the welding current to the secondary. Hence, minimum power loss and resistance variation is obtained in the welding circuit.

Referring to Fig. 3, the means for momentarily energizing the primaries of the transformer as each stay wire passes between the upper and lower rotary electrodes, may include an electronic tube device indicated diagrammatically at 62, one located preferably ahead of each shaft 32 and arranged to be excited by a stay wire passing the same. Each electronic tube device 62 may be electrically connected by a conductor 63 to one side of the supply line 39 and by a conductor 64 through a contactor 65 to one of the collector rings 37, the other collector ring being connected to the other side of the supply line.

Accordingly, as a stay wire passes the electronic tube device and excites the same, current flows through the primary windings of all the lower rotary electrodes mounted on the adjacent shaft 32, and induces welding current in the secondary circuits flowing through the line wires and the stay wire passing between the upper and lower electrodes at that moment.

Alternate means for energizing the primaries of the transformers at proper time intervals for welding each stay wire to pairs of line wires may include well known timing devices indicated diagrammatically at 62a geared to gears 62b on shafts 32.

If desired, suitable well known devices may be operatively connected to said electronic tubes 62 or timing devices 62a for producing rapid pulsations in the welding current to reduce heating of the electrodes. Moreover, the rotary electrodes may be cooled with an air blast or provided with suitable passages for cooling water circulated from the hollow shafts therethrough.

As shown, there are three lower rotary electrodes 31 transversely spaced on three longitudinally spaced shafts 32 in order to give ample space for mounting the electrodes. However, the number and spacing of the electrodes may vary with the spacing of the wire mesh being made. Each lower electrode 31 contacts two or more line wires, and the electrodes may be arranged as indicated in Fig. 3. Considering the top line wire as the first, the upper left electrode contacts the first and fourth line wires, the middle electrode on the same shaft contacts the seventh and tenth, and the bottom electrode contacts the thirteenth and sixteenth. The electrodes on the other two shafts 32 are laterally offset from those on the first shaft and from each other so that all of the eighteen line wires are contacted by the nine electrodes. Thus, six series welds are made at one time by each transverse row of three electrodes, and where closer spaced line wires are welded, multiples of two welds would be made in series-parallel by each electrode.

Figure 4:
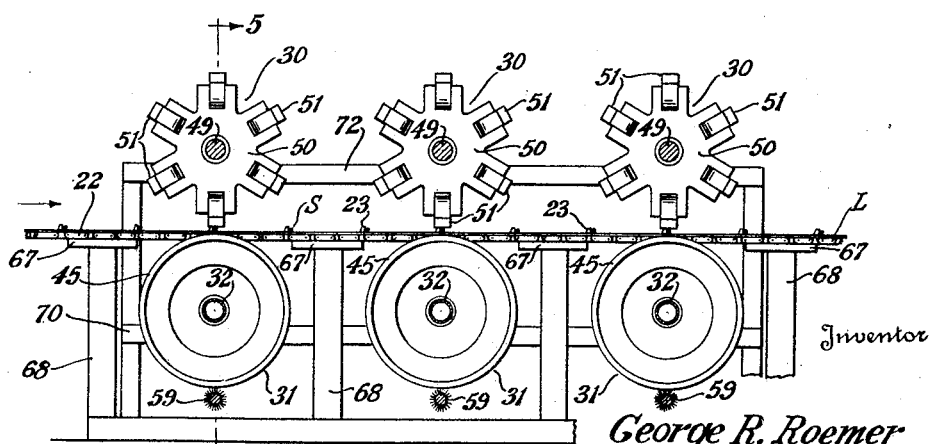
Fig. 4 is a sectional view thereof as on line 4—4, Fig. 3.

The conveyor chains 22 are preferably spaced transversely of the shafts 32 in a manner indicated in Figs. 3 and 5, so that the chains pass between certain of the rotary electrodes 31 and between the contact surfaces 46 of said other rotary electrodes. Thus, the flange portions 47 of the electrodes partially support certain of the chains 22, as indicated in Figs. 5 and 6. The chains are preferably further supported between the transverse rows of rotary electrodes by supporting bars 67 on upright frame members 68, as indicated in Fig. 4.

The lower shafts 32 may be journaled in suitable bearings indicated diagrammatically at 69 and supported on frame members 70, and likewise the upper shafts 49 may be journaled in bearings 71 (Fig. 1) on frame member 72.

The welded wire mesh on leaving the sprocket drum 25, may then pass under a suitable electric timer 75, electrically connected to the driving means such as motor 76 of a flying shear 77, for actuating the shear at proper intervals to cut the wire mesh into desired lengths. If desired, slitters may be provided ahead of the shear between the line wires for producing narrow widths of welded mesh, or for bevel cutting the stay wires between each pair of line wires to produce single strands with laterally projecting stay wire portions, which single strands may have their stay wire portions bent as desired around the strands, and can be used to replace the conventional barbed wire strands.

After leaving the shear 77, the sheared lengths of welded wire mesh may pass through a flipper 78, the driving motor 79 of which is electrically connected to the timer 75, as shown, for directing the sheared lengths selectively through guides 80 to power driven reel 82, or through guides 81 to power driven reel 83.

Welded wire mesh may be made according to the present invention continuously and at high speed in a simple and economical manner, because the present invention eliminates substantially all of the inherent disadvantages of prior methods and apparatus.

In the present invention a high amperage current is utilized for high speed welding with a minimum of power loss and resistance variation; substantially uniform welds are obtained at all the joints between the line wires and stay wires; the welding contacts are kept constantly clean; and replacement of parts is required only at infrequent intervals. Moreover, the present invention is applicable either to series welding or series-parallel welding.

I claim:

1. Apparatus for continuously welding wire mesh, including a pair of upper and lower rotary electrodes, one electrode being mounted on a hollow shaft and embodying a transformer, means conducting primary current through the shaft directly to and from said transformer, the outer rim of said one electrode having laterally spaced continuous cylindric contact surfaces insulated from each other and in the secondary circuit of said transformer for contacting at least two laterally spaced line wires, means on said other rotary electrode for exerting substantially uniform pressure on a stay wire where it crosses said line wires, and means positioned below said wire mesh and extending longitudinally between the cylindric contact surfaces of said one electrode for engaging and moving said wire mesh between said upper and lower electrodes.

2. Apparatus for continuously welding wire mesh, including a hollow shaft; lower rotary electrode means including a rotary transformer mounted on said shaft; means moving line wires with stay wires positioned across the same over said lower electrode means; means conducting primary current through the shaft directly to and from said transformer; said lower rotary electrode means also including laterally spaced, outer, continuous, cylindrical rim contact surfaces in the secondary circuit of said transformer and insulated from each other for contacting at least two laterally spaced line wires; upper rotary electrode means uniformly pressing a stay wire against the line wires backed up by said laterally spaced cylindrical contact surfaces as each stay wire passes between the upper and lower electrode means; and means at one end of said hollow shaft actuated by the passage of each stay wire momentarily energizing the transformer primary circuit while a stay wire positioned across said line wires is pressed against the line wires and said contact surfaces.

3. Apparatus for continuously welding wire mesh, including laterally spaced pairs of upper and lower rotary electrodes, one electrode of each pair being mounted on a hollow shaft and embodying a transformer, means conducting primary current through said shaft to said transformers, laterally spaced continuous cylindric contact surfaces insulated from each other on each of said one electrodes and in the secondary circuit of said transformer for contacting at least two laterally spaced wires, and means on the other electrode of each pair for exerting substantially uniform pressure on a stay wire positioned across said line wires, and means positioned below said wire mesh and extending longitudinally between the cylindric contact surfaces of said one electrode for engaging and moving said wire mesh between said upper and lower electrodes.

4. Apparatus for continuously welding wire mesh, including a hollow shaft; lower rotary electrode means including a rotary transformer mounted on said shaft; means moving line wires with stay wires positioned across the same over said lower electrode means; means conducting primary current through the shaft directly to and from said transformer; said lower rotary electrode means also including laterally spaced, outer, continuous, cylindrical rim contact surfaces in the secondary circuit of said transformer and insulated from each other each contacting two laterally spaced line wires; upper rotary electrode means uniformly pressing a stay wire against the line wires backed up by said laterally spaced cylindrical contact surfaces as each stay wire passes between the upper and lower electrode means; and means at one end of said hollow shaft actuated by the passage of each stay wire momentarily energizing the transformer primary circuit while a stay wire positioned across said line wires is pressed against the line wires and said contact surfaces.

5. Apparatus for continuously welding wire mesh, including laterally spaced pairs of aligned upper and lower rotary electrodes; means moving line wires with stay wires positioned across the same between said upper and lower electrodes; one electrode of each pair being mounted on a hollow shaft and including a transformer; means conducting primary current through said shaft to said transformers; each lower electrode also including laterally spaced, outer, continuous, cylindrical rim contact surfaces in the secondary circuit of its transformer and insulated from each other for contacting at least two laterally spaced line wires; each upper electrode being constructed and arranged to substantially uniformly press a stay wire against the line wires backed up by said laterally spaced cylindrical contact surfaces as each stay wire passes between the upper and lower electrodes; and means at one end of said hollow shaft actuated by the passage of each stay wire momentarily energizing the transformer primary circuits of all laterally aligned electrodes while a stay wire positioned across said line wires is pressed against the line wires and said contact surfaces.

6. Apparatus for continuously welding wire mesh, including a hollow shaft extending laterally under said wire mesh, a plurality of rotary electrodes each embodying a transformer and mounted on said hollow shaft, means moving line wires of said mesh with stay wires positioned across the same over said rotary electrodes, means at one end of said shaft automatically momentarily conducting current through the shaft to the transformer primary of each electrode as a stay wire passes over said electrodes, and laterally spaced continuous ring contacts on each electrode and in the secondary circuit of its transformer for contacting at least two laterally spaced line wires to conduct secondary current through a stay wire positioned across the same.

7. Apparatus for continuously welding wire mesh, including a hollow shaft extending laterally under said wire mesh, a plurality of lower rotary electrodes each embodying a transformer and mounted on said hollow shaft, means moving line wires of said mesh with stay wires positioned across the same over said lower rotary electrodes, means at one end of said shaft automatically momentarily conducting current through the shaft to the transformer primary of each lower electrode as a stay wire passes over said electrodes, laterally spaced continuous ring contacts on each lower electrode and in the secondary circuit of its transformer for contacting at least two laterally spaced line wires to conduct secondary current through a stay wire positioned across the same, and upper rotary electrode means uniformly pressing a stay wire passing over said ring contacts against the line wires supported thereby.

8. Apparatus for continuously welding wire mesh, including laterally spaced pairs of upper and lower rotary electrodes, one electrode of each pair including a transformer, laterally spaced continuous cylindrical contact surfaces insulated from each other on each of said one electrodes and in the secondary circuit of said transformer for contacting at least two laterally spaced wires, the other electrode of each pair exerting substantially uniform pressure on a stay wire positioned across said line wires, means remote from said electrodes actuated by the passage of each stay wire momentarily energizing the transformer primary circuit while a stay wire positioned across said line wires is pressed against the line wires and said contact surfaces, and means positioned below said wire mesh and extending longitudinally between the cylindrical contact surfaces of said one electrode for engaging and moving said wire mesh between said upper and lower electrodes.

9. Apparatus for continuously welding wire mesh, including laterally spaced pairs of upper and lower rotary electrodes, one electrode of each pair being mounted on a hollow shaft and including a transformer, means conducting primary current through said shaft to said transformers, laterally spaced continuous cylindrical contact surfaces insulated from each other on each of said one electrodes and in the secondary circuit of said transformer for contacting at least two laterally spaced wires, the other electrode of each pair exerting substantially uniform pressure on a stay wire positioned across said line wires, means remote from said electrodes actuated by the passage of each stay wire momentarily energizing the transformer primary circuit while a stay wire positioned across said line wires is pressed against the line wires and said contact surfaces, and means positioned below said wire mesh and extending longitudinally between the cylindrical contact surfaces of said one electrode for engaging and moving said wire mesh between said upper and lower electrodes.

GEORGE R. ROEMER.